US012688838B2

(12) United States Patent
Ke et al.

(10) Patent No.: US 12,688,838 B2
(45) Date of Patent: Jul. 21, 2026

(54) DISPLAY PANEL AND METHOD FOR DRIVING THE SAME

(71) Applicant: AUO Corporation, Hsinchu City (TW)

(72) Inventors: Yi-Jyun Ke, Hsinchu City (TW); Heng-Yi Tseng, Hsinchu City (TW); Yi-Han Tseng, Hsinchu City (TW); Kun-Cheng Tien, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/970,996

(22) Filed: Dec. 6, 2024

(65) Prior Publication Data

US 2026/0004751 A1 Jan. 1, 2026

(30) Foreign Application Priority Data

Jun. 28, 2024 (TW) ................................ 113124410

(51) Int. Cl.
*G09G 3/36* (2006.01)

(52) U.S. Cl.
CPC ... *G09G 3/3607* (2013.01); *G09G 2320/0233* (2013.01); *G09G 2320/0271* (2013.01)

(58) Field of Classification Search
None
See application file for complete search history.

(56) References Cited

U.S. PATENT DOCUMENTS 6,268,839 B1 7/2001 Yang et al.
2009/0189847 A1 7/2009 Hughes et al.
2012/0218317 A1* 8/2012 Choi .................... G09G 3/3655 345/87
2013/0342777 A1* 12/2013 Jeong ................ G02F 1/134336 349/38
2015/0294640 A1* 10/2015 Lei ....................... G09G 3/2096 348/445
2023/0097941 A1* 3/2023 Sang .................... G09G 3/3233 345/204
2024/0355258 A1* 10/2024 Huang ..................... G09G 3/20

FOREIGN PATENT DOCUMENTS

CN 101114415 A 1/2008
TW 200721084 A 6/2007
TW 201001385 A 1/2010

* cited by examiner

*Primary Examiner* — Parul H Gupta
(74) *Attorney, Agent, or Firm* — WPAT, PC

(57) ABSTRACT

A method for driving a display panel includes (a) inputting a waveform to a data line in a target time, in which the target time is longer, a reflectivity of a plurality of liquid crystal molecules in the display panel is lower; (b) inputting a voltage to a first gate line in a time interval; (c) inputting the voltage to a second gate line in the time interval, in which the first gate line is not input with the voltage; (d) inputting the voltage to a third gate line in the time interval, in which the first gate line and the second gate line are not input with the voltage; and (e) repeating steps (b) to (d) until the target time, in which the target time is at least 40 milliseconds.

10 Claims, 8 Drawing Sheets

DISPLAY PANEL AND METHOD FOR DRIVING THE SAME

CROSS-REFERENCE TO RELATED APPLICATION

This application claims priority to Taiwan Application Serial Number 113124410, filed Jun. 28, 2024, which is herein incorporated by reference.

BACKGROUND

Field of Invention

The present disclosure relates to a display panel and a method for driving the display panel.

Description of Related Art

In the field of LCDs, cholesteric liquid crystal is widely used in the LCDs due to their bistable characteristics. In the application of bistable cholesteric liquid crystal, there are two different applications of passive and active. Among them, passive applications need to calculate resistance multiplied by capacitance of all pixels on a data line, so resistance-capacitance delay (RC-delay) will be very large.

In addition, although active applications can improve the RC-delay by about two orders of magnitude, a cross-voltage required to switch cholesteric liquid crystal is very large, so a novel method for driving a display is required.

SUMMARY

One technical aspect of the present disclosure is a method for driving a display panel.

According to an embodiment of the present disclosure, a method for driving a display panel includes: (a) inputting a waveform to a data line in a target time, in which the target time is longer, a reflectivity of a plurality of liquid crystal molecules in the display panel is lower; (b) inputting a voltage to a first gate line in a time interval; (c) inputting the voltage to a second gate line in the time interval, in which the first gate line is not input with the voltage; (d) inputting the voltage to a third gate line in the time interval, in which the first gate line and the second gate line are not input with the voltage; and (e) repeating step (b) to step (d) until the target time, in which the target time is at least 40 milliseconds.

According to an embodiment of the present disclosure, the method for driving the display panel further includes inputting the waveform of positive and negative symmetry to a data line at a frequency to change the reflectivity of the liquid crystal molecules of the display panel.

According to an embodiment of the present disclosure, the method for driving the display panel further includes resetting the data line with a fixed frequency signal before step (a).

According to an embodiment of the present disclosure, step (e) includes storing the voltage through a plurality of thin film transistors.

According to an embodiment of the present disclosure, the method for driving the display panel further includes inputting a waveform of positive and negative symmetry to a data line at a frequency to change the reflectivity of the liquid crystal molecules of the display panel, in which a voltage of a positive direction of the waveform changes between at least two voltages with time.

Another technical aspect of the present disclosure is a display panel.

According to an embodiment of the present disclosure, a display panel includes a voltage control unit, a first gate line, a second gate line, a third gate line, a data line and a plurality of thin film transistors. The voltage control unit is configured to control an input voltage. The first gate line is electrically connected to the voltage control unit and configured to input a voltage through the voltage control unit in a time interval. The second gate line is electrically connected to the voltage control unit and configured to input the voltage through the voltage control unit in the time interval, in which when the second gate line is input with the voltage, the first gate line is not input with the voltage. The third gate line is electrically connected to the voltage control unit and configured to input the voltage through the voltage control unit in the time interval, in which when the third gate line is input with the voltage, the first gate line and the second gate line are not input with the voltage. The data line is electrically connected to the voltage control unit, and configured to adjust a grayscale of the display panel through the voltage control unit. The thin film transistors are electrically connected to the data line, and configure to store the voltage of the data line.

According to an embodiment of the present disclosure, the voltage control unit is configured to input a waveform of positive and negative symmetry to the data line to change a reflectivity of a plurality of liquid crystal molecules of the display panel.

According to an embodiment of the present disclosure, when the voltage control unit adjusts the grayscale of the display panel through the data line, the thin film transistors store the voltage.

According to an embodiment of the present disclosure, the voltage control unit is configured to input a waveform of positive and negative symmetry to the data line to change a reflectivity of a plurality of liquid crystal molecules of the display panel, and a voltage of a positive direction of the waveform changes between at least two voltages with time.

According to an embodiment of the present disclosure, the voltage control unit is configured to input a fixed frequency signal to the data line to reset the data line.

Another technical aspect of the present disclosure is a method for driving a display panel.

According to an embodiment of the present disclosure, a method for driving a display panel includes: (a) inputting a waveform to a data line in a target time, in which the target time is longer, a reflectivity of a plurality of liquid crystal molecules in the display panel is lower; (b) inputting a voltage to a first gate line in a time interval; (c) inputting the voltage to a second gate line in the time interval, in which the first gate line is not input with the voltage; (d) inputting the voltage to a third gate line in the time interval, in which the first gate line and the second gate line are not input with the voltage; and (e) repeating step (b) to step (d) until the target time, in which the target time is no longer than 30 seconds.

According to an embodiment of the present disclosure, the method for driving the display panel further includes inputting the waveform of positive and negative symmetry to a data line at a frequency to change the reflectivity of the liquid crystal molecules of the display panel.

According to an embodiment of the present disclosure, the method for driving the display panel further includes resetting the data line with a fixed frequency signal before step (a).

According to an embodiment of the present disclosure, step (e) includes storing the voltage through a plurality of thin film transistors.

According to an embodiment of the present disclosure, the method for driving the display panel further includes inputting a waveform of positive and negative symmetry to a data line at a frequency to change the reflectivity of the liquid crystal molecules of the display panel, in which a voltage of a positive direction of the waveform changes between at least two voltages with time.

In the above-described embodiments of the present disclosure, since the voltage is repeatedly input to the first gate line, the second gate line and the third gate line until the target time and the voltage waveform is input to the data line within the target time to change the reflectivity of the liquid crystal molecules, the grayscale of the LCD can be adjusted in a shorter time to achieve the effect of adjusting brightness and darkness of the display.

BRIEF DESCRIPTION OF THE DRAWINGS

Aspects of the present disclosure are best understood from the following description of implementations when read in conjunction with accompanying figures. Note that in accordance with standard practice in this industry, various features are not drawn to scale. In fact, dimensions of various features may be arbitrarily increased or reduced for clarity of discussion.

DETAILED DESCRIPTION

Figure 1:
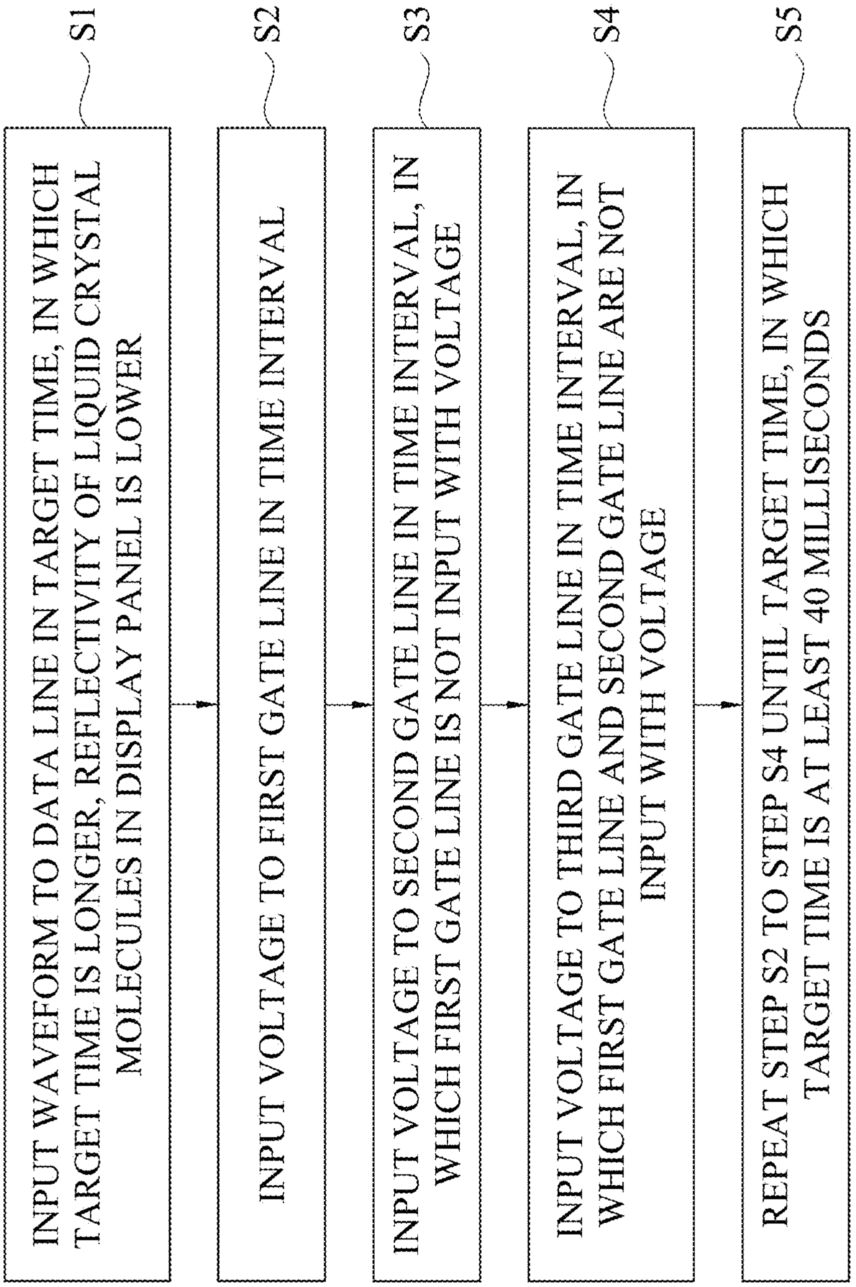
FIG. 1 illustrates a flowchart of a method for driving a display panel according to one embodiment of the present disclosure.

The description of the embodiments disclosed below provides many different embodiments or examples, for implementing various features of the provided subject matter. Specific examples of components and arrangements are described below to simplify the present application. Of course, these examples are examples only and are not intended to be limiting. Additionally, reference symbols and/or letters may be repeated in each example. This repetition is for simplicity and clarity and does not by itself specify a relationship between various embodiments and/or configurations discussed.

Spatially relative terms such as "below", "beneath", "lower", "over", "upper", etc. may be used herein for the purpose of convenience of description to describe the relationship of one element or feature to another element or feature as shown in the drawings. Spatially relative terms are intended to encompass different orientations of the device in use or operation in addition to the orientation illustrated in the figures. The device may be otherwise oriented (rotated 90 degrees or at other orientations), and the spatially relative descriptions used herein interpreted accordingly.

As used herein, "about", "approximately", or "substantially" includes a stated value and an average within an acceptable deviation range from a particular value as determined by one of ordinary skill in the art, taking into account the measurement discussed and a specific amount of error associated with the measurement (i.e., limitations of the measurement system). For example, "about" may mean within one or more standard deviations of the stated value, or within +30%, +20%, +10%, +5%. Furthermore, the terms "about", "approximately", or "substantially" used herein can be used to select a more acceptable deviation range or standard deviation based on optical properties, etching properties, or other properties, instead of using one standard deviation to apply to all properties.

FIG. 1 illustrates a flowchart of a method for driving a display panel according to one embodiment of the present disclosure. Referring to FIG. 1, a method for driving a display panel includes following steps. First, in step S1, a waveform is input to a data line in a target time. The longer the target time, the lower the reflectivity of a plurality of liquid crystal molecules in the display panel. Next, in step S2, a voltage is input to a first gate line in a time interval. Next, in step S3, the voltage is input to a second gate line in the time interval, in which the first gate line is not input with the voltage. Next, in step S4, the voltage is input to a third gate line in the time interval, in which the first gate line and the second gate line are not input with the voltage. Finally, in step S5, step S2 to step S4 are repeated until the target time, in which the target time is at least 40 milliseconds.

In some embodiments, the method for driving the display panel is not limited to above-mentioned step S1 to step S5. For example, in some embodiments, other steps may be further included between step S1 and step S5, and other steps may be further included before step S1, and other steps may be further included after step S5. In the following description, at least the above steps will be explained.

Figure 2:
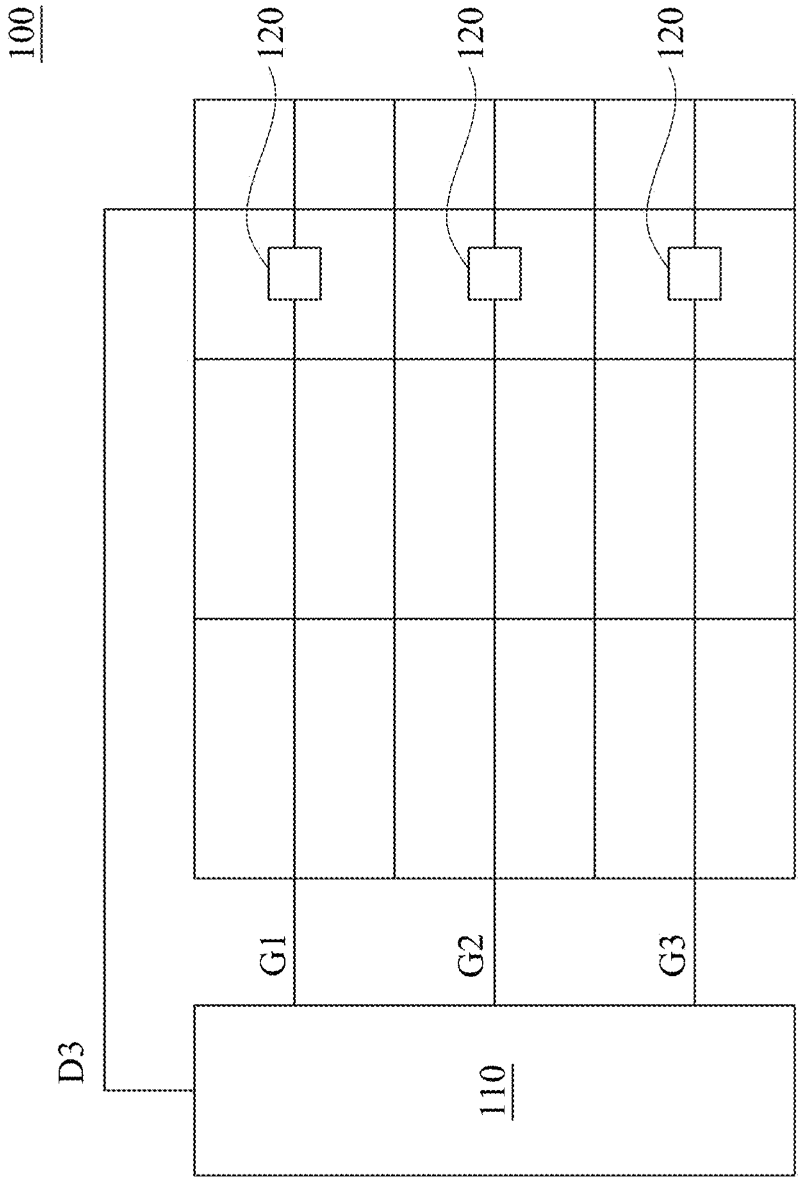
FIG. 2 illustrates a block diagram of a display panel according to one embodiment of the present disclosure.
Figure 3:
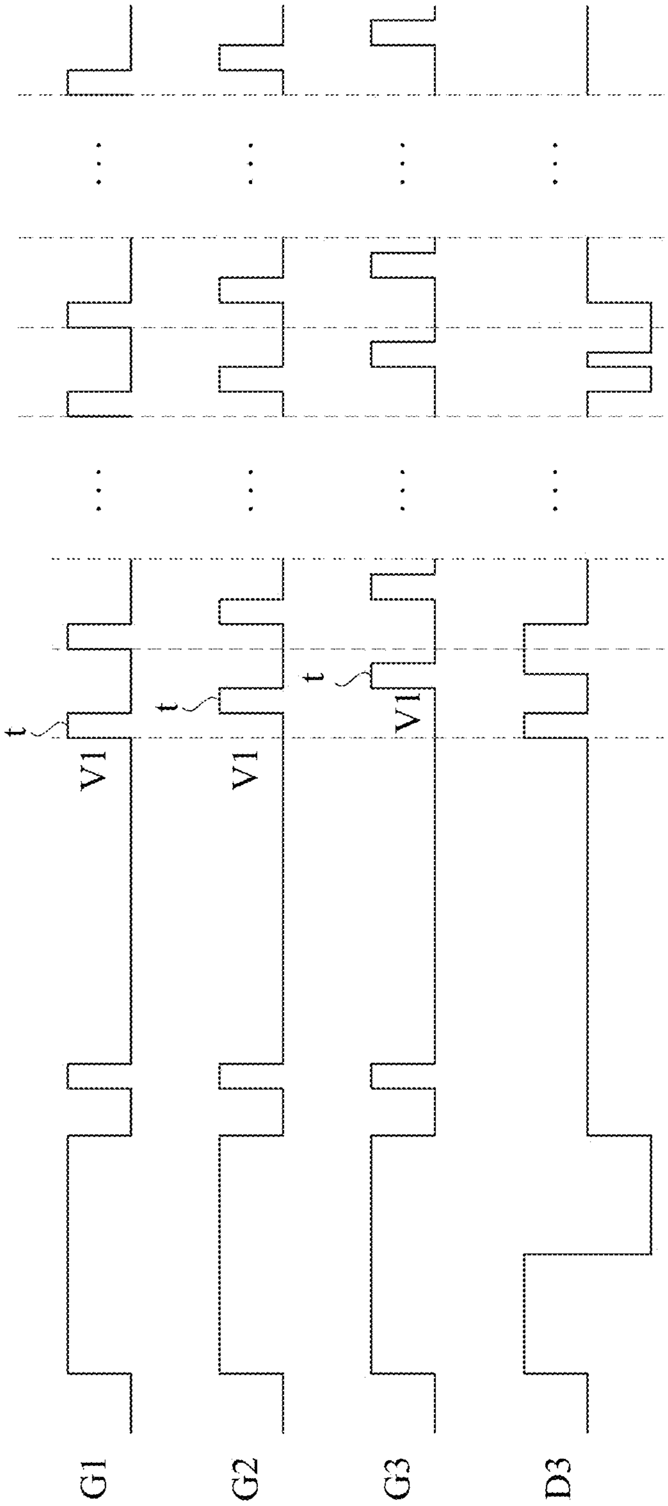
FIG. 3 illustrates a schematic diagram of a voltage change of each of a first gate line, a second gate line, a third gate line and a data line over time according to one embodiment of the present disclosure.

FIG. 2 illustrates a block diagram of a display panel 100 according to one embodiment of the present disclosure. FIG. 3 illustrates a schematic diagram of a voltage change of each of a first gate line G1, a second gate line G2, a third gate line G3 and a data line D over time t according to one embodiment of the present disclosure. Referring to FIG. 2 and FIG. 3 at the same time, the display panel 100 includes a voltage control unit 110, a first gate line G1, a second gate line G2, a third gate line G3, a plurality of thin film transistors 120, and a data line D. The voltage control unit 110 is configured to control an input voltage. The first gate line G1 is electrically connected to the voltage control unit 110 and configured to input a voltage V1 through the voltage control unit 110 in a time interval T. The second gate line G2 is electrically connected to the voltage control unit 110 and configured to input the voltage V1 through the voltage control unit 110 in the time interval T. When the second gate line G2 is input with the voltage V1, the first gate line G1 is not input with the voltage V1. The third gate line G3 is electrically connected to the voltage control unit 110 and configured to input the voltage V1 through the voltage control unit 110 in the time interval T, in which when the third gate line G3 is input with the voltage V1, the first gate line G1 and the second gate line G2 are not input with the voltage V1. The data line D is electrically connected to the voltage control unit 110 and configured to adjust a grayscale of the display panel 100 through the voltage control unit 110. The thin film transistors 120 are electrically connected to the data line D and configured to store the voltage of the data line D.

Specifically, when the voltage V1 is given to the first gate line G1, the second gate line G2, and the third gate line G3, in order to greatly reduce the time it takes for an entire process, the voltage V1 is given to the first gate line G1 in the time interval T, and the voltage V1 is then given to the second gate line G2 in the time interval T, and the voltage V1 is then given to the third gate line G3 in the time interval T. After giving the first gate line G1, the second gate line G2, and the third gate line G3 in order, it continues to repeat this cycle until it reaches the target time. The shortest target time can be 41.6 milliseconds, and the maximum can reach 30 seconds. In this process, the thin film transistors 120 in the display panel 100 stores the voltage of the data line.

Figure 4:
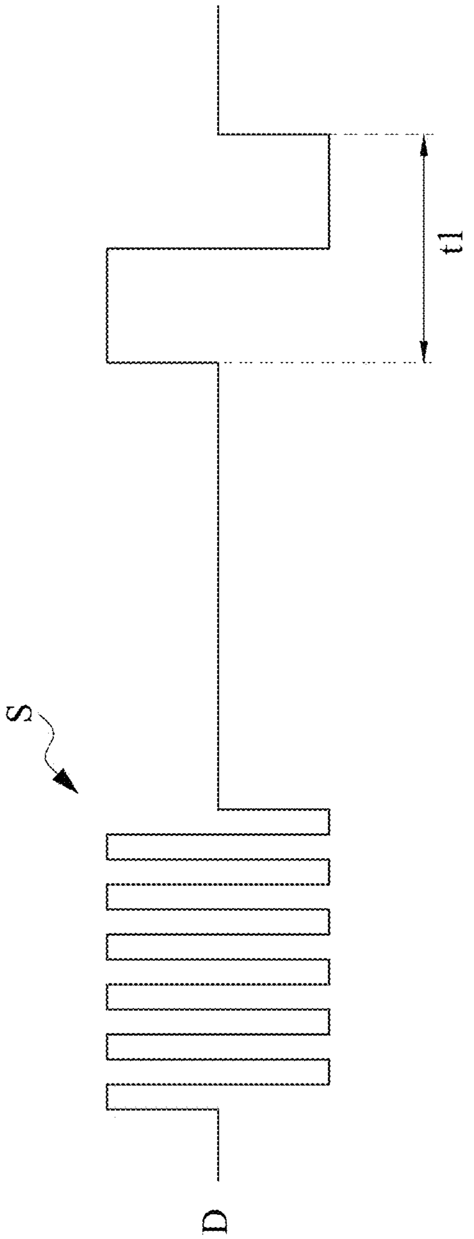
FIG. 4 and FIG. 5 illustrate schematic diagrams of voltage changes of a data line over time according to another embodiment of the present disclosure.
Figure 5:
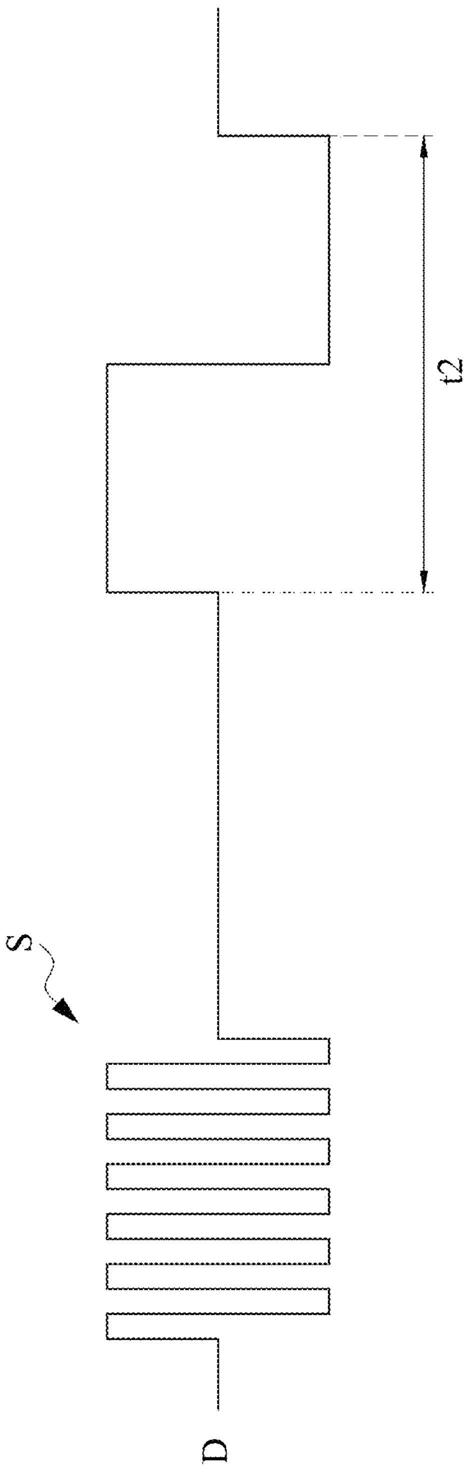

FIG. 4 and FIG. 5 illustrate schematic diagrams of voltage V changes of a data line D over time T according to another embodiment of the present disclosure. Referring to FIG. 4 and FIG. 5, the method for driving the display panel further includes resetting the data line D with a fixed frequency signal S before step S1. The fixed frequency signal S can be, for example, a set of signals of 60 Hz and 40 volts, but the present disclosure is not limited thereto. Subsequently, the data line enters a "waiting" state before starting to "scan." "Scan" involves inputting a set of waveform of positive and negative symmetry. The difference between FIG. 4 and FIG. 5 is that a scanning time t1 of FIG. 4 is shorter than a scanning time t2 of FIG. 5. Even under the same voltage condition, different scanning times will result in different reflectivity results, which will be detailed in FIG. 6.

Figure 6:
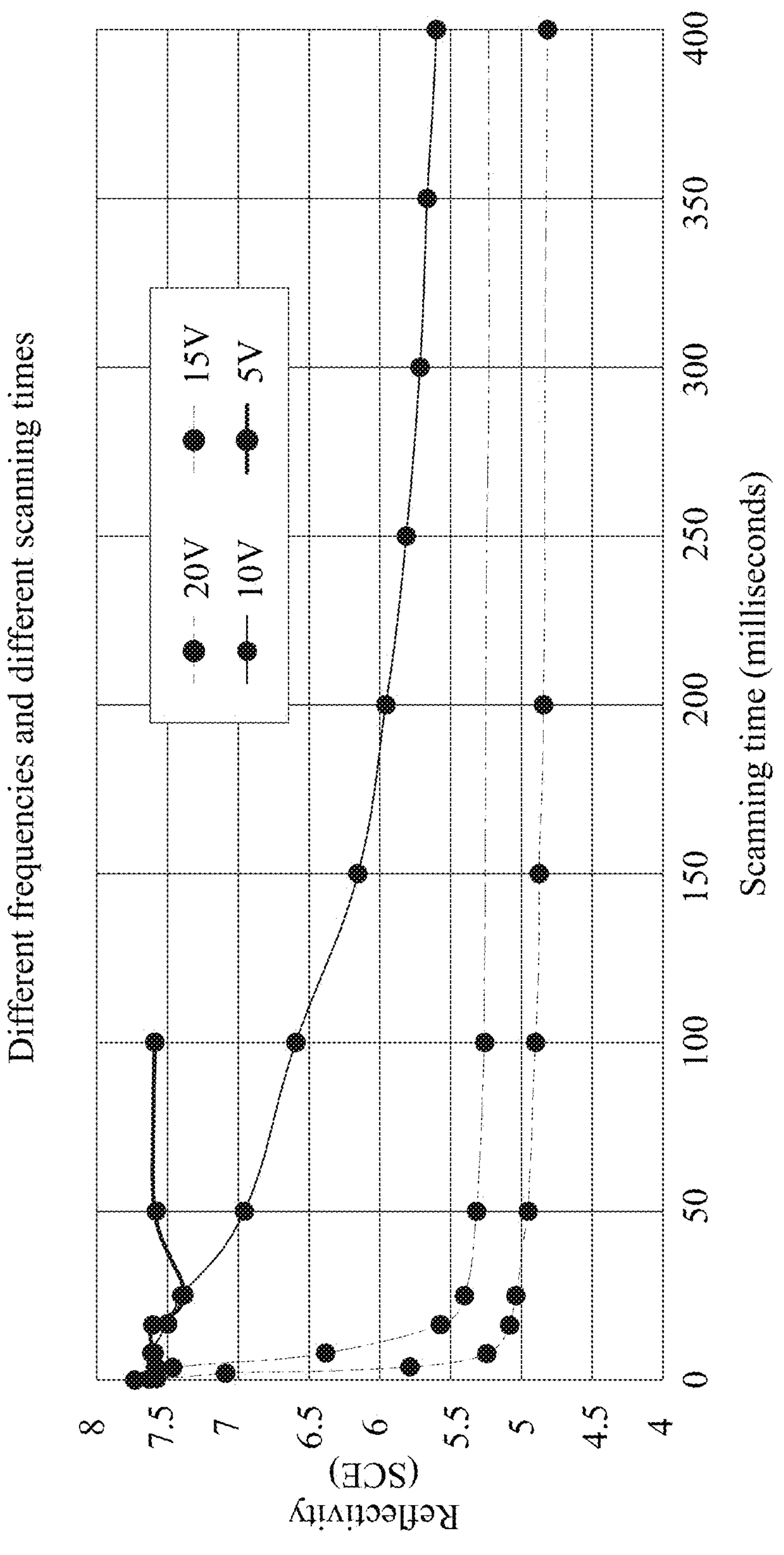
FIG. 6 illustrates a relationship diagram of reflectivity versus scanning time of a display panel at different voltages according to one embodiment of the present disclosure.

FIG. 6 illustrates a relationship diagram of reflectivity versus scanning time of a display panel at different voltages according to one embodiment of the present disclosure. Referring to FIG. 6, under the same voltage, as long as the scanning time is longer (e.g., the scanning time t2 in FIG. 5), the reflectivity of the display panel will be lower. Therefore, the scanning time of the data line will change the reflectivity of the liquid crystal molecules in the display panel. In addition, the greater the input voltage, the more obvious the change in reflectivity of the display panel with the scanning time is in a range of 0 milliseconds to 50 milliseconds.

Referring to FIG. 3, the waveform input to the data line D in FIG. 3 when the first gate line G1, the second gate line G2 and the third gate line G3 start charging is also the aforementioned "scan", so it also controls the grayscale (i.e., the reflectivity) of the display panel 100 (see FIG. 2).

In the following description, scanning methods of the data line in different embodiments will be described in detail.

Figure 7:
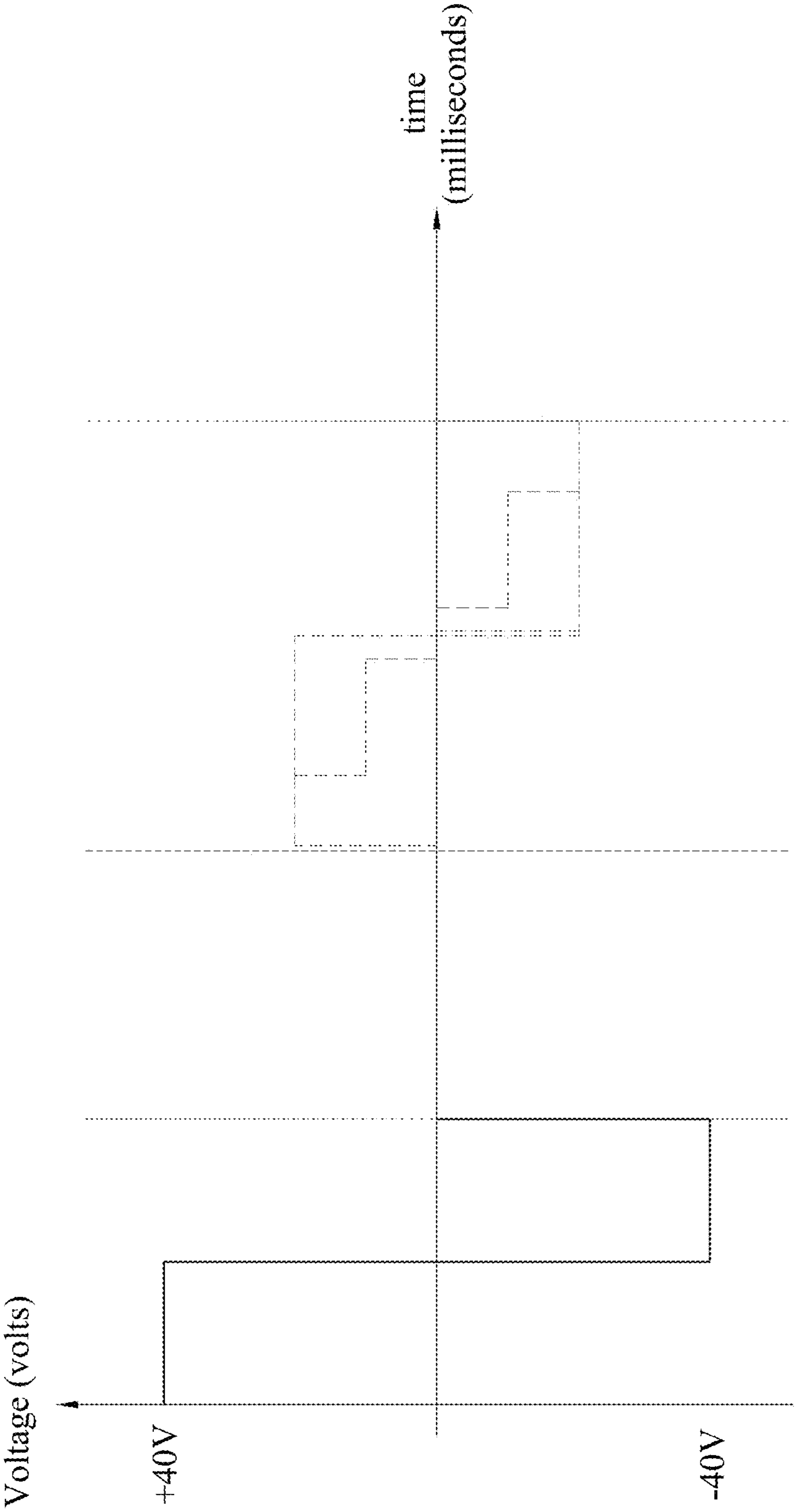
FIG. 7 illustrates a schematic diagram of a voltage change of a data line over time according to another embodiment of the present disclosure.

FIG. 7 illustrates a schematic diagram of a voltage change of a data line over time according to another embodiment of the present disclosure. The difference between this embodiment and the embodiment in FIG. 4 or FIG. 5 is that in this embodiment, during the scanning step, the data line does not have one positive voltage, one negative voltage and zero bias voltage, but two positive voltages and two negative voltages. Since a page turning time of the display panel is equal to a frame time multiplied by a number of frames, and the number of frames is positively related to a color depth, which is the following formula:

$$H_{Frame\ number}^{Voltage\ number} = \text{Voltage combination}$$

For example, $$H_{64}^{2} = 65,\ H_{10}^{3} = 66,\ H_{6}^{4} = 84.$$

Therefore, several more sets of voltages can be used to reduce the number of frames, thereby shortening the page change time.

Figure 8:
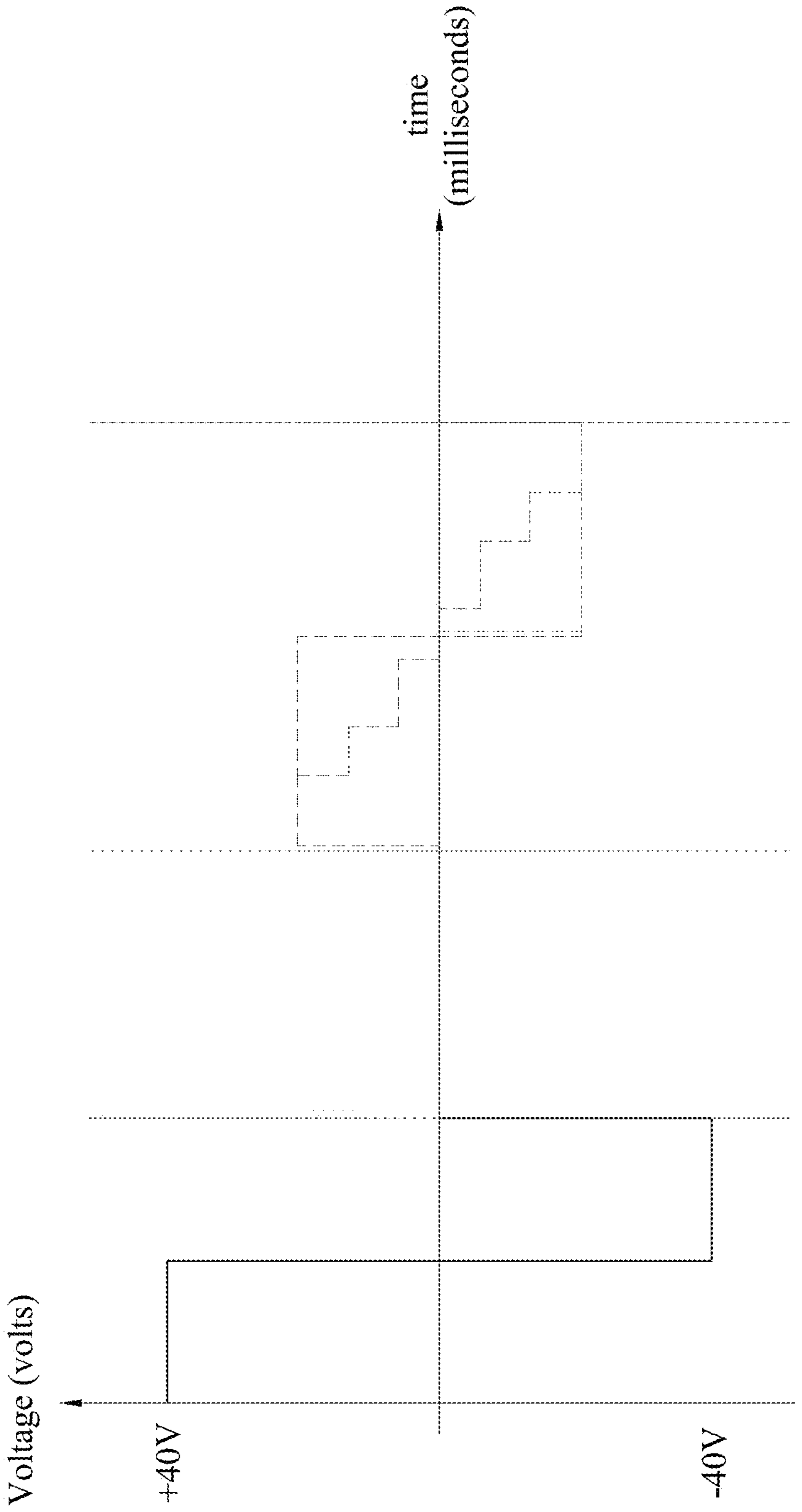
FIG. 8 illustrates a schematic diagram of a voltage change of a data line over time according to another embodiment of the present disclosure.

FIG. 8 illustrates a schematic diagram of a voltage change of a data line over time according to another embodiment of the present disclosure. The difference between this embodiment and the embodiment in FIG. 7 is that in this embodiment, during the scanning step, the data line does not have two positive voltages, two negative voltages and zero bias voltage, but three positive voltages and three negative voltages. As mentioned above, more voltage combinations can greatly shorten the page turning time, thus improving the performance of the display panel.

To sum up, since the voltage is repeatedly input to the first gate line, the second gate line and the third gate line until the target time, and the voltage waveform is input to the data line within the target time to change the reflectivity of the liquid crystal molecules, the grayscale of the LCD can be adjusted in a shorter time to achieve the effect of adjusting brightness and darkness of the display.

The foregoing summarizes the features of several embodiments so that those skilled in the art can better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also recognize that such equivalent constructions do not depart from the spirit and scope of the present disclosure, and that those can be variously changed, substituted, and altered herein without departing from the spirit and scope of the present disclosure.

What is claimed is:

1. A method for driving a display panel, comprising:

(a) inputting a waveform to a data line in a target time, wherein the target time is longer, a reflectivity of a plurality of liquid crystal molecules in the display panel is lower, wherein the display panel comprises a voltage control unit, a first gate line, a second gate line, a third gate line, and the data line, wherein the voltage control unit is configured to control an input voltage, wherein the first gate line, the second gate line, the third gate line, and the data line are electrically connected to the voltage control unit, wherein the data line is configured to adjust a grayscale of the display panel through the voltage control unit;

(b) inputting a voltage to the first gate line through the voltage control unit in a time interval;

(c) inputting the voltage to the second gate line through the voltage control unit in the time interval, wherein when the second gate line is input with the voltage, the first gate line is not input with the voltage;

(d) inputting the voltage to the third gate line through the voltage control unit in the time interval, wherein when the third gate line is input with the voltage, the first gate line and the second gate line are not input with the voltage; and (e) repeating step (b) to step (d), in a sequential and non-overlapping repeating manner, until the target time, wherein the target time is in a range of 41.6 milliseconds to 30 seconds;

wherein the display panel further comprises a plurality of thin film transistors, and the thin film transistors are electrically connected to the data line and configured to store the voltage of the data line, wherein the voltage control unit is configured to input a waveform of positive and negative symmetry to the data line, and the waveform comprises a positive voltage, a zero voltage, and a negative voltage.

2. The method for driving the display panel of claim 1, further comprising:

inputting the waveform the data line at a frequency to change the reflectivity of the liquid crystal molecules of the display panel.

3. The method for driving the display panel of claim 2, further comprising:

resetting the data line with a fixed frequency signal before step (a).

4. The method for driving the display panel of claim 1, wherein step (e) comprises storing the voltage through the thin film transistors.

5. The method for driving the display panel of claim 1, further comprising:

inputting the waveform of positive and negative symmetry to the data line at a frequency to change the reflectivity of the liquid crystal molecules of the display panel, wherein a voltage of a positive direction of the waveform changes between at least two voltages with time.

6. A display panel, comprising:

a voltage control unit, configured to control an input voltage;

a first gate line, electrically connected to the voltage control unit, and configured to input a voltage through the voltage control unit in a time interval;

a second gate line, electrically connected to the voltage control unit, and configured to input the voltage through the voltage control unit in the time interval, wherein when the second gate line is input with the voltage, the first gate line is not input with the voltage;

a third gate line, electrically connected to the voltage control unit, and configured to input the voltage through the voltage control unit in the time interval, wherein when the third gate line is input with the voltage, the first gate line and the second gate line are not input with the voltage;

a data line, electrically connected to the voltage control unit, and configured to adjust a grayscale of the display panel through the voltage control unit; and a plurality of thin film transistors, electrically connected to the data line, and configured to store the voltage of the data line;

wherein the voltage control unit is configured to input a waveform of positive and negative symmetry to the data line, and the waveform comprises a positive voltage, a zero voltage, and a negative voltage;

wherein the voltage control unit inputs the voltage to the first gate line, the second gate line, and the third gate line, in a sequential and non-overlapping repeating manner, until a target time, and the target time is in a range of 41.6 milliseconds to 30 seconds.

7. The display panel of claim 6, wherein the voltage control unit is configured to input the waveform to the data line to change a reflectivity of a plurality of liquid crystal molecules of the display panel.

8. The display panel of claim 6, wherein when the voltage control unit adjusts the grayscale of the display panel through the data line, the thin film transistors store the voltage.

9. The display panel of claim 6, wherein the voltage control unit is configured to input the waveform to the data line to change a reflectivity of a plurality of liquid crystal molecules of the display panel, and a voltage of a positive direction of the waveform changes between at least two voltages with time.

10. The display panel of claim 6, wherein the voltage control unit is configured to input a fixed frequency signal to the data line to reset the data line.

* * * * *